United States Patent [19]

O'Connor

[11] 4,138,820

[45] Feb. 13, 1979

[54] METRIC GAUGE

[76] Inventor: David O'Connor, P.O. Box 317, Warwick, N.Y. 10990

[21] Appl. No.: 742,512

[22] Filed: Nov. 16, 1976

[51] Int. Cl.² .............................................. G01B 3/34
[52] U.S. Cl. ................................ 33/168 R; 33/178 B; 33/199 R
[58] Field of Search ............ 33/168 R, 174 B, 174 G, 33/178 B, 199 R; D10/64

[56] References Cited

U.S. PATENT DOCUMENTS

| D. 147,743 | 10/1947 | Cambron | D10/64 |
| 1,246,536 | 11/1917 | Bristol | 33/178 B |
| 2,364,529 | 5/1944 | Hill | 33/174 B X |
| 2,528,431 | 10/1950 | Greenberg | 33/199 R |
| 2,604,702 | 7/1952 | Collins | 33/178 B |
| 2,896,333 | 7/1959 | Kivela | 33/178 B |
| 3,406,461 | 10/1968 | Gunderson | 33/199 R |

FOREIGN PATENT DOCUMENTS 747114  11/1966  Canada ................................ 33/199 R

OTHER PUBLICATIONS

Plastics World, p. 29, Styrene Nut, Bolt Gauge, Jan. 1953.

Primary Examiner—Charles E. Phillips
Attorney, Agent, or Firm—Weiser, Stapler & Spivak

[57] ABSTRACT

A metric gauge including a planar body having formed therein a plurality of varying sized sockets suitable for measuring wrench size, screw size, and nut size. A scale with offset index shoulder is also provided to measure bolt and screw length.

Each of the sockets is hexagonally or otherwise formed at the planar body to receive a bolt head or nut therein to precisely measure wrench size. A seat or shoulder for the bolt head or nut is formed below the planar surface at each socket to rest the bolt head or the nut thereon when sizing.

Each of the sockets is downwardly formed to a hollow cylindrical configuration of a varying diameters for bolt diameter measuring purposes. Each socket terminates downwardly in a cylindrical bottom of known outside diameter to receive thereon a nut for gauging the nut diameter. The scale edge of the planar surface is impressed with a plurality of graduations which may be in millimeters or inches which extend from the index shoulder.

5 Claims, 7 Drawing Figures

METRIC GAUGE

BACKGROUND OF THE INVENTION

The present invention relates to measuring devices in general, and more particularly, is directed to a gauge suitable to measure the common dimensions of bolts and nuts such as diameter, length, nut size and wrench size.

Prior workers in the field have developed various measuring and gauging devices for nuts and bolts to enable workmen and others to easily determine the sizes and dimensions of materials. Gauges and templates have been designed to measure such parameters as length, screw diameter and the like. All of the prior art devices of which I am familiar have the common shortcoming of being limited in application in that only one or two separate measurements could be made with a single instrument. This meant that a plurality of gauges would have had to be employed in order to measure or gauge the dimensions of nuts and bolts such as screw length, wrench size, screw diameter and nut size.

For example, in U.S. Pat. No. 2,896,333, a sizing gauge is shown which employs toroidal recesses for sizing purposes and with circular grooves for measuring water pipes. U.S. Pat. No. 2,728,145 shows a template which is usable as a screw gauge. U.S. Pat. No. Des. 104,867 shows a gauge having a plurality of various sized recesses. U.S. Pat. No. 3,858,325 shows a template having the capability of measuring the diameter and thread of a bolt. However, none of these devices teaches or suggests a single, multi-purpose gauge which is suitable to measure or gauge many different characteristics in simple, compact arrangement.

SUMMARY OF THE INVENTION

The present invention relates generally to the field of measuring devices, and more particularly, is directed to a metric or other wrench, nut and bolt gauge capable of functioning in four measuring modes, namely, wrench size for bolt heads and nuts, screw size, nut size and screw length.

The present invention comprises a gauge having a generally planar body which may be of molded plastic. Formed therein are a plurality of integral sockets of varying sizes for wrench size, nut size, bolt size and screw length measuring purposes.

Preferably, each of the sockets is formed at its top or at the planar body surface in a hexagonal configuration to measure wrench sizes by placing a bolt head or nut therein for determining the correct size. The planar body has indicia molded directly therein to visually indicate the numerical size of each measuring component thereof. Each of the sockets is downwardly formed below the hexagonal configuration area in a hollow cylindrical shape of varying diameter to thereby easily measure the diameter of a bolt by simply inserting the bolt into one socket after another until the correct diameter is gauged.

Each of the measuring sockets terminates downwardly in a solid or hollow cylindrical configuration of varying diameters whereby by placing a nut on the outside diameter of the cylindrical section, the diameter of the nut can be readily determined.

A metric scale preferably in the form of millimeter and centimeter graduations is formed along one straight edge of the gauge planar body to thereby permit easy notation of the length of screw of a bolt. An offset shoulder is designed at the index of the scale to facilitate placing the piece to be measured.

The metric gauge of the present invention thereby provides in a single, compact, easily formed device the capability of measuring wrench size, screw size, screw length and nut size of a plurality of various sizes of nuts and bolts. Preferably, the graduations and sizes are designed for metric measurements but of course, other scales may be used if desired, such as inches and feet.

It is therefore an object of the present invention to provide an improved metric gauge of the type set forth.

It is another object of the present invention to provide a novel metric gauge having a plurality of various sized sockets depending from a planar body surface.

It is another object of the present invention to provide a novel metric gauge including a planar body surface and a plurality of sockets depending from and formed in the surface, each of the sockets being formed at the surface in a hexagonal configuration to receive therein a bolt head or nut for wrench size measuring purposes.

It is another object of the present invention to provide a novel metric gauge including a planar body surface and a plurality of sockets depending from the surface, each of the sockets being inwardly formed to provide measuring capability for a hexagonal or other shape heads or nuts and an interior cylindrical configuration of various diameter to measure bolt diameters.

It is another object of the present invention to provide a novel metric gauge including a planar body and a plurality of sockets depending from the body, each of the sockets having an external cylindrically formed portion, an internal hollow cylindrically formed portion and an internal hexagonal portion communicating with the internal cylindrical portion for nut and bolt measuring purposes.

It is another object of the present invention to provide a novel metric gauge having the capability of measuring screw length, socket means for gauging bolt heads or nuts for wrench sizing and internal, hollow cylindrical means for measuring the diameters of the bolts.

It is another object of the present invention to provide a novel metric gauge that is inexpensive in manufacture, simple in design and trouble free when in use.

Other objects and a fuller understanding of the invention will be had by referring to the following description and drawings wherein like reference characters refer to similar parts throughout and in which:

DESCRIPTION OF THE PREFERRED EMBODIMENT OF THE INVENTION

Although specific terms are employed in the following description for the sake of clarity, these terms are intended to refer only to the particular embodiment selected for illustration and are not intended to define or limit the scope of the invention.

Figure 1:
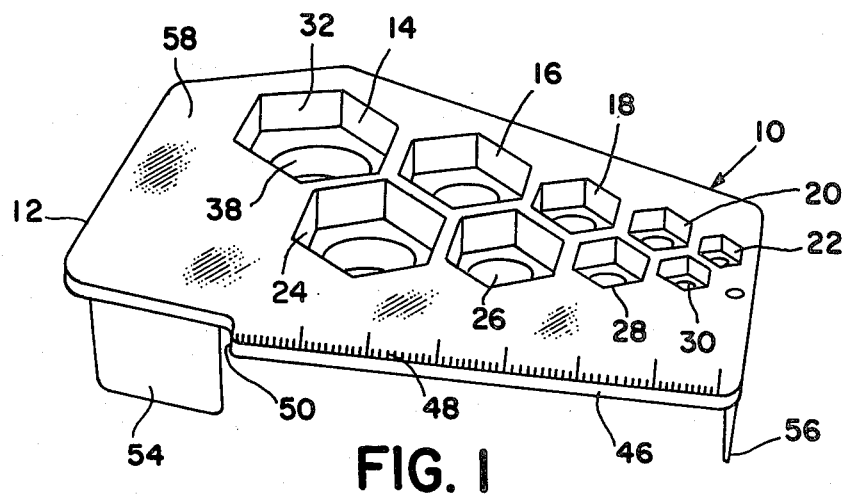
FIG. 1 is a perspective view of a metric gauge constructed in accordance with the teachings of the present invention.

Referring now to the drawings, there is shown in FIG. 1 a metric gauge, generally designated 10, suitable for determining various measurements of nut and bolt combinations including the size of wrench to be employed, screw size, bolt diameter and size of nut. The invention comprises generally a planar body 12 which is molded of a suitable plastic material, for example ABS plastic. A plurality of integral, depending sockets 14, 16, 18, 20, 22, 24, 26, 28, 30 are molded or otherwise formed in the body 12. It will be appreciated that although nine variously sized sockets are shown for purposes of illustration, the gauge 10 may be formed with more sockets or less sockets and still come within the scope and meaning of this invention.

Each of the sockets 14, 16, 18, 20, 22, 24, 26, 28 and 30 is similarly shaped or formed to include the same basic elements of various sizes to enable the gauge 10 to be employed to measure a great variety of sizes of nuts and bolts. Taking socket 14 as an example, the construction and use of this socket will be fully described. Similar explanations relating to the remaining sockets need not be set forth in detail inasmuch as the construction and function is similar to that of socket 14, only the size being changed to accommodate various sizes of nuts and bolts.

The socket 14 is formed to provide a hexagonal or other shaped recess 32 which is molded, shaped or otherwise formed directly into the planar body 12 and preferably depends downwardly therefrom. The recess 32 is hexagonally formed to receive the hexagonal head 34 (FIG. 4) of a conventional machine bolt 36. Of course the recess 32 could be shaped to other configurations such as a square, pentagonal, octagonal or other to gauge or size heads of other shapes of machine bolt heads if so desired. The recess 32 terminates downwardly in a communicating, hollow, cylindrical section 38 which is formed with an open interior bore to receive the threaded section 40 of the machine bolt 36 for diameter or screw size determining purposes.

Figure 2:
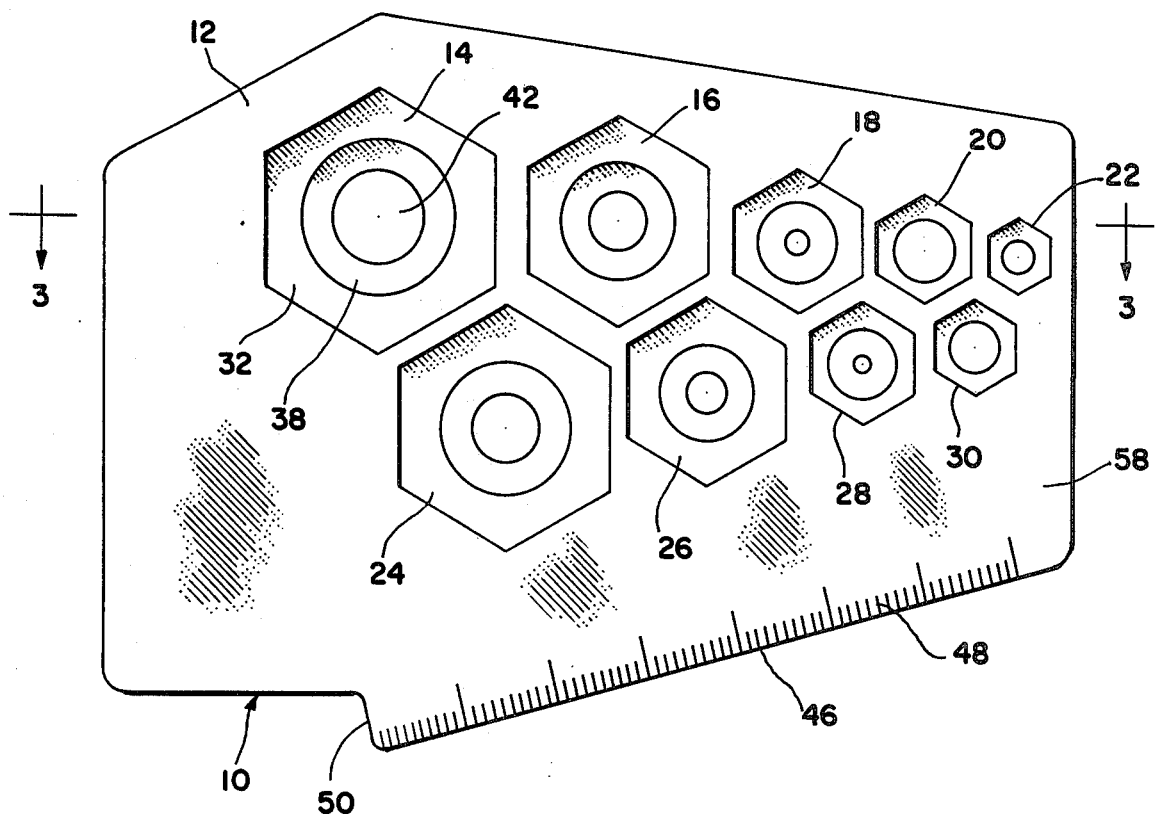
FIG. 2 is an enlarged top plan view of the metric gauge of FIG. 1.
Figure 6:
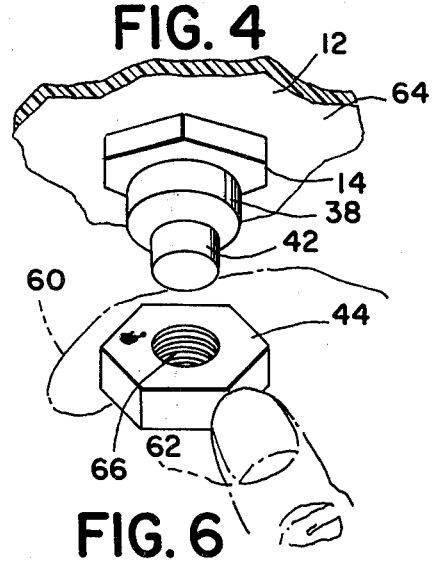
FIG. 6 is an enlarged, perspective, fragmentary view showing use of the gauge in determining nut size.

The cylindrical section 38 terminates downwardly at a contiguous, narrow, cylindrical section 42 which may be either hollow or solid inasmuch as the interior portion of the second cylindrical section 42 serves no working purpose in the present embodiment. Rather, the second cylindrical section 42 is outwardly cylindrically formed to receive thereon a conventional nut 44 (FIG. 6) for nut sizing purposes. The various sockets 14, 16, 18, 20, 22, 24, 26, 28 and 30 as illustrated in FIGS. 1 and 2 all have cylindrical sections 38 of different diameter, interior bores to thereby measure or gauge bolts of various diameters. Similarly, all of the various sockets have a contiguous, narrow, exterior, cylindrical section 42 which is exteriorly employed for nut sizing purposes. The various exterior cylindrical sections are formed to different diameters to thereby make the gauge adaptable for use with nuts of a variety of different sizes.

Figure 3:
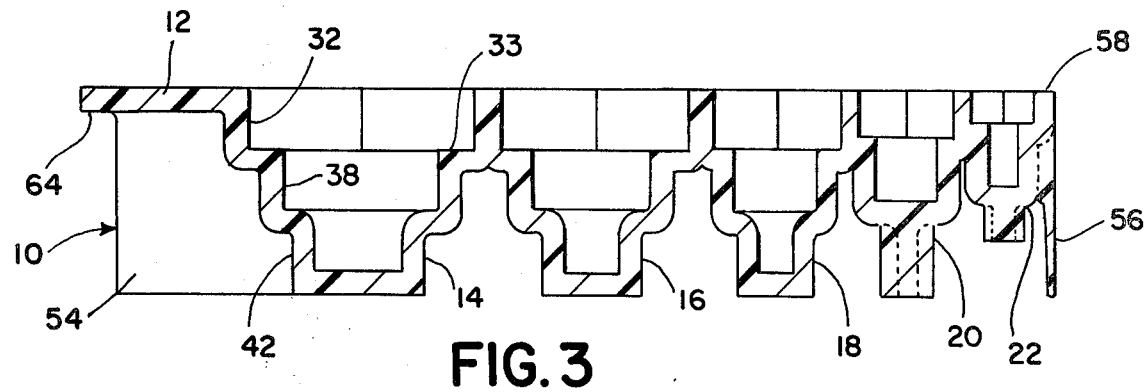
FIG. 3 is a cross sectional view taken along line 3—3 of FIG. 2, looking in the direction of the arrows.
Figure 4:
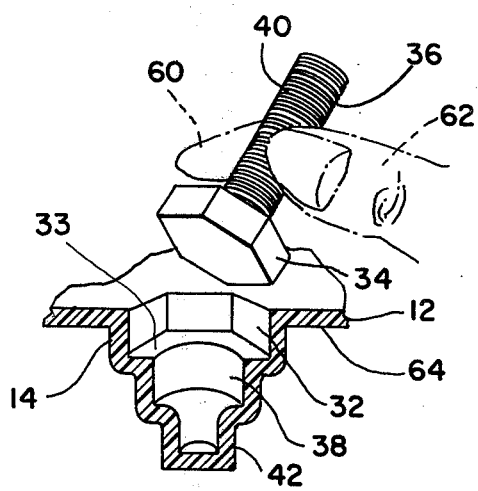
FIG. 4 is an enlarged, perspective, fragmentary view showing use of the gauge in determining wrench size.
Figure 5:
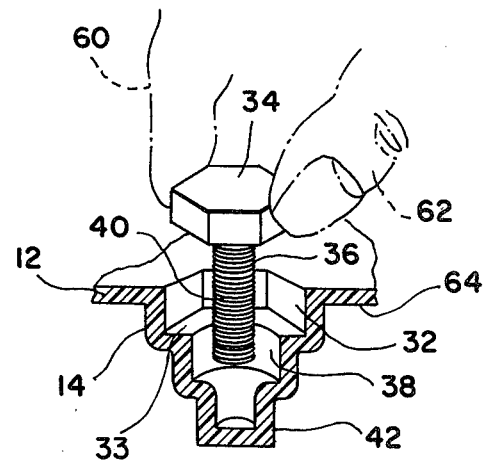
FIG. 5 is an enlarged, perspective, fragmentary view showing use of the gauge in determining bolt diameter.

As best seen in FIGS. 3, 4 and 5, a shoulder 33 is formed intermediate each recess 32 and its communicating cylindrical section 38. The shoulders 33 serve as convenient stops to rest thereon a bolt head 34 or nut 44 during the gauging procedure.

As best seen in FIGS. 1 and 2, one edge 46 of the planar body 12 may be employed as a scale by inscribing, molding or otherwide providing a scale 48 which preferably shows millimeters and centimeters for measuring the length of the threaded section 40 of a machine bolt 36. The scale edge 46 terminates at its index point in a shoulder 50 to receive and properly position the offset portion 52 of the machine bolt head 34 during measuring procedures. See FIG. 7.

As best seen in FIGS. 1 and 3, the metric gauge 10 may be made self standing by simply molding or otherwide attaching a plurality of depending legs 56, 54 to permit the device to be readily rested upon a surface (not shown) when employing the gauge as a measuring instrument.

In order to use the metric gauge of the present invention, the device is set upon a surface (not shown) or is hand held with the top surface 58 of the planar body 12 looking upwardly. In this manner, the sockets 14, 16, 18, 20, 22, 24, 26, 28 and 30 open upwardly and are readily available to receive therein either a head 34 of a machine bolt 36 or a nut 44 for wrench sizing purposes. The bolt head 34 or the nut 44 can be simply moved across the top surface 58 of the planar body 12 until the bolt head or the nut fits one of the hexagonal recesses 32 for wrench sizing purposes. As best seen in FIG. 4, the machine bolt 36 is held in the fingers 60, 62 of the user and is manipulated and otherwise moved until the head 34 fits within one of the hexagonal recesses 32 which is of proper size to thereby determine the correct wrench size.

Similarly, as best seen in FIG. 5, when it is desired to utilize the metric gauge 10 for determining the diameter of the screw threaded section 40 of a machine bolt 36, the fingers 60, 62 are employed to insert the machine bolt 34 in turn into the various sockets 14, 16, 18, 20, 22, 24, 26, 28 or 30 until the correct interior cylindrical section 38 is found to snugly overfit the threaded section 40 to thereby determine the diameter thereof.

When it is desired to employ the gauge 10 for nut sizing purposes, a nut 44 is grasped in the fingers 60, 62 and it is applied to the underside 64 of the planar body 12 as illustrated. The nut 44 is applied in turn over various exterior cylindrical sections 42 until the correct diameter of the threaded bore 66 can be determined.

Figure 7:
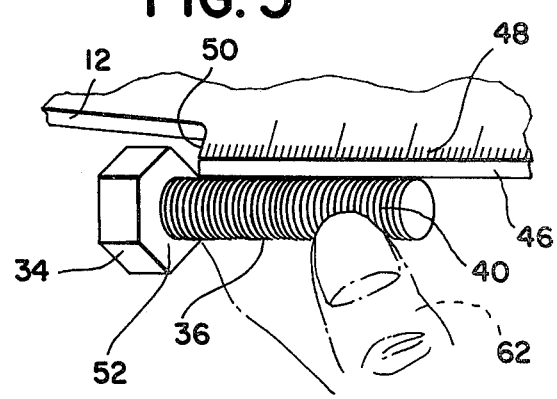
FIG. 7 is an enlarged, perspective, fragmentary view showing use of the gauge in determining screw length.

Referring now to FIG. 7 the use of the gauge 10 for determining the length of the threaded section 40 of a machine bolt 36 is illustrated. In this mode of operation, the bolt head 34 is applied against the shoulder 50 until the offset portion 52 of the bolt head 34 snugly contacts the shoulder 50. The threaded section 40 of the bolt 36 is positioned to extend lengthwise along the body edge 46 in alignment with the scale 48. In this manner, the length can be readily read directly on the scale graduations.

Thus there is shown a new metric gauge which functions in four ways and takes all of the confusion out of metric measurements. The top surface 58 of the planar body 12 preferably is permanently provided with direct reading size indications (not illustrated) at each of the sockets 14, 16, 18, 20, 22, 24, 26, 28 and 30 and at the scale 48. The size indications may be provided in any well-known manner such as by molding or printing.

Although I have described the present invention with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a gauge for measuring nuts and bolts, including bolt heads and bolt screws, the combination of
    a body,
    said body being formed into a plurality of measuring sockets to gauge sizes of components of the nuts and bolts;
    said sockets having means non-circular in cross section to gauge the wrench size of a bolt;
    said sockets having means circular in cross section to gauge the diameter of a bolt;
    said sockets further comprising cylindrical means to gauge nut size, said cylindrical means to gauge nut size extending from the circular means to gauge bolt diameter, said circular means and said cylindrical means being cylindrical in configuration;
    the cylindrical configuration of the cylindrical means to gauge nut size comprising a cylindrical outer peripheral surface, the outer peripheral surface receiving the nut thereon for measuring purposes;
    whereby the single gauge can be employed for a plurality of gauging operations.

2. The gauge of claim 1 wherein the noncircular means to gauge wrench size and the circular means to gauge bolt diameters are communicating.

3. The gauge of claim 2 wherein a shoulder is interposed between the non-circular means to gauge wrench size and the circular means to gauge bolt diameter to receive thereon the nut or bolt head being measured.

4. The gauge of claim 1 wherein the cylindrical configuration of the circular means to gauge screw size comprises a cylindrical inner peripheral surface, the cylindrical inner peripheral surface receiving the bolt screw therein for measuring purposes.

5. The gauge of claim 1 wherein the body has a top and a bottom, the non-circular means to gauge wrench size and the circular means to gauge bolt diameter being open to the top, and wherein the cylindrical means to gauge nut size extends downwardly from the said bottom.

* * * * *